United States Patent [19]
Cooper

[11] Patent Number: 5,271,694
[45] Date of Patent: Dec. 21, 1993

[54] METHOD AND APPARATUS FOR TREATMENT OF CONTAMINATED SOIL PARTICLES

[75] Inventor: George A. Cooper, San Antonio, Tex.

[73] Assignee: Cooper Equipment Company, San Antonio, Tex.

[21] Appl. No.: 2,760

[22] Filed: Jan. 12, 1993

[51] Int. Cl.$^5$ .......................... B09B 3/00; E02D 3/12
[52] U.S. Cl. .................................. 405/128; 405/258; 405/268
[58] Field of Search .............. 405/128, 129, 258, 263; 210/747, 751; 110/346

[56] References Cited

U.S. PATENT DOCUMENTS

| | | | |
|---|---|---|---|
| 4,849,360 | 7/1989 | Norris et al. | |
| 4,913,586 | 4/1990 | Gabbita | 405/129 |
| 4,927,293 | 5/1990 | Campbell | 405/128 |
| 4,942,929 | 7/1990 | Malachosky et al. | 405/128 X |
| 4,993,498 | 2/1991 | Fresnel | |
| 5,024,770 | 6/1991 | Boyd et al. | 210/747 |
| 5,039,415 | 8/1991 | Smith | |

Primary Examiner—Dennis L. Taylor

[57] ABSTRACT

Soil that is contaminated by hydrocarbons or other deleterious chemicals is processed through a soil shredding apparatus to break the soil into small particles having a substantially uniform maximum size. The particles are then conveyed to a location above a deposit area and directed onto the deposit area to form a growing pile of contaminated particles. Concurrently, a substantially cone shaped spray of an aqueous solution containing anti-contaminating agents, such as bacteriological microbes is sprayed on the pile. The configuration of the conical pile, taken in conjunction with the application of the liquid spray produces a rolling of the particles down the sides of the growing conical pile, thereby insuring the contacting of substantially all of the surfaces of each particle by the liquid containing the decontaminating agents. Concurrently, the moisture content of the conical pile of contaminated particles is periodically checked, and the flow rate of the liquid spray is appropriately adjusted to maintain a desired minimum water content and concentration of anti-contaminating agents within the conical pile of soil particles.

14 Claims, 8 Drawing Sheets

NOZZLE CONFIGURATION

| Flow Rate | Pressure | A | B | C | D | E | F | G |
|---|---|---|---|---|---|---|---|---|
| --- LOW VOLUME FLOW RATES --- | | | | | | | | |
| 0.5 gpm | 20 psi | ON | | | | | | |
| 0.6 gpm | 30 psi | ON | | | | | | |
| 0.7 gpm | 40 psi | ON | | | | | | |
| 0.8 gpm | 50 psi | ON | | | | | | |
| 0.8 gpm | 60 psi | ON | | | | | | |
| 0.9 gpm | 20 psi | | ON | | | | | |
| 1.1 gpm | 30 psi | | ON | | | | | |
| 1.3 gpm | 40 psi | | ON | | | | | |
| 1.4 gpm | 50 psi | | ON | | | | | |
| 1.5 gpm | 60 psi | | ON | | | | | |
| 1.6 gpm | 30 psi | | | ON | | | | |
| 1.7 gpm | 30 psi | ON | ON | | | | | |
| 1.8 gpm | 20 psi | ON | | ON | | | | |
| 1.8 gpm | 40 psi | | | ON | | | | |
| 2.0 gpm | 20 psi | | | | ON | | | |
| 2.0 gpm | 40 psi | ON | ON | | | | | |
| 2.0 gpm | 50 psi | | | ON | | | | |
| 2.5 gpm | 30 psi | | | | ON | | | |
| 2.5 gpm | 40 psi | ON | | ON | | | | |
| 3.0 gpm | 20 psi | | ON | | ON | | | |
| 3.0 gpm | 40 psi | | | ON | | | | |
| 3.0 gpm | 60 psi | ON | ON | | | | | |
| 3.5 gpm | 20 psi | | | | | ON | | |
| 3.5 gpm | 60 psi | | | | ON | | | |
| 4.0 gpm | 20 psi | ON | | | | ON | | |
| 4.0 gpm | 30 psi | | | ON | ON | | | |
| 4.0 gpm | 50 psi | ON | | | ON | | | |
| 4.5 gpm | 50 psi | | | ON | | ON | | |
| 4.5 gpm | 60 psi | ON | ON | ON | | | | |
| 5.0 gpm | 20 psi | ON | ON | | | ON | | |
| 5.0 gpm | 30 psi | | ON | ON | ON | | | |
| 5.0 gpm | 40 psi | ON | ON | | ON | | | |
| 5.0 gpm | 60 psi | | | ON | ON | | | |
| 5.5 gpm | 20 psi | | | | | | ON | |
| 5.5 gpm | 40 psi | | ON | | | ON | | |
| 5.5 gpm | 60 psi | | | ON | ON | | | |
| 6.0 gpm | 20 psi | | ON | | | | ON | |
| 6.0 gpm | 40 psi | | | ON | ON | ON | | |
| 6.0 gpm | 50 psi | | ON | | | ON | | |
| 6.5 gpm | 20 psi | | | | | | | ON |
| 6.5 gpm | 30 psi | | | | | | | ON |
| 6.5 gpm | 40 psi | | | | ON | ON | | |
| 6.5 gpm | 50 psi | | | ON | ON | ON | | |
| 6.5 gpm | 60 psi | | ON | | ON | ON | | |

NOZZLE CONFIGURATION

| Flow Rate | Pressure | A | B | C | D | E | F |
|---|---|---|---|---|---|---|---|
| 7.0 gpm | 20 psi | ON | | | | | |
| 7.0 gpm | 30 psi | | ON | ON | | ON | |
| 7.5 gpm | 20 psi | | | | ON | | ON |
| 7.5 gpm | 30 psi | ON | ON | ON | | ON | |
| 7.5 gpm | 40 psi | | | | | | ON |
| 8.0 gpm | 40 psi | | | ON | ON | | ON |
| 8.0 gpm | 50 psi | | ON | | ON | | ON |
| 8.0 gpm | 60 psi | ON | ON | ON | ON | | |
| 8.5 gpm | 20 psi | | | ON | | ON | ON |
| 8.5 gpm | 50 psi | | | | | ON | ON |
| 9.0 gpm | 20 psi | | | | | ON | ON |
| 9.0 gpm | 30 psi | | | | ON | | ON |
| 9.0 gpm | 40 psi | | ON | | | ON | ON |
| 9.5 gpm | 20 psi | | | ON | | ON | |
| 9.5 gpm | 30 psi | ON | ON | | | | |
| 9.5 gpm | 40 psi | | | | ON | ON | ON |
| 9.5 gpm | 60 psi | | ON | ON | | ON | |
| 10.0 gpm | 20 psi | | | | | | ON |
| 10.0 gpm | 30 psi | ON | ON | ON | ON | ON | |
| 10.0 gpm | 40 psi | ON | | ON | | | ON |
| 10.0 gpm | 50 psi | | | ON | | ON | ON |
| 10.0 gpm | 60 psi | ON | | | | | ON |
| 10.5 gpm | 20 psi | ON | | | | ON | |
| 10.5 gpm | 30 psi | | ON | ON | | | |
| 10.5 gpm | 40 psi | | | | ON | | ON |
| 10.5 gpm | 50 psi | | | ON | ON | ON | |
| 11.0 gpm | 20 psi | | | | ON | ON | ON |
| 11.0 gpm | 30 psi | ON | ON | ON | | | |
| 11.0 gpm | 50 psi | | ON | | | | |
| 11.5 gpm | 20 psi | ON | | | ON | ON | ON |
| 11.5 gpm | 40 psi | ON | ON | ON | ON | ON | |
| 11.5 gpm | 60 psi | | | ON | ON | ON | |
| 12.0 gpm | 20 psi | | | | | | ON |
| 12.0 gpm | 30 psi | | | | | ON | |
| 12.0 gpm | 40 psi | | | ON | ON | | |
| 12.0 gpm | 50 psi | | ON | ON | ON | ON | |
| 12.0 gpm | 60 psi | | | ON | | | |
| 12.5 gpm | 20 psi | ON | | | | | ON |
| 12.5 gpm | 30 psi | ON | ON | | | ON | ON |
| 12.5 gpm | 40 psi | ON | ON | ON | | | |
| 12.5 gpm | 50 psi | ON | ON | ON | | | ON |

FIG. 4A

NOZZLE CONFIGURATION

| Flow Rate | Pressure | A | B | C | D | E | F | G |
|---|---|---|---|---|---|---|---|---|
| 13.0 gpm | 20 psi | | ON | | ON | ON | | ON |
| 13.0 gpm | 30 psi | | ON | ON | ON | | | ON |
| 13.0 gpm | 40 psi | ON | | ON | ON | | ON | |
| 13.0 gpm | 50 psi | | ON | | ON | | ON | |
| 13.0 gpm | 60 psi | | ON | ON | ON | ON | | |
| 13.5 gpm | 20 psi | ON | ON | | ON | ON | | ON |
| 13.5 gpm | 30 psi | | ON | ON | | ON | ON | |
| 13.5 gpm | 40 psi | | ON | ON | ON | ON | | |
| 13.5 gpm | 50 psi | ON | | | ON | | | ON |
| 13.5 gpm | 60 psi | ON | | | ON | | ON | |
| 14.0 gpm | 20 psi | | | | ON | | ON | ON |
| 14.0 gpm | 30 psi | ON | | ON | | ON | | ON |
| 14.0 gpm | 40 psi | | | ON | | ON | ON | |
| 14.0 gpm | 50 psi | | | ON | | ON | | ON |
| 14.0 gpm | 60 psi | | | | ON | | | ON |
| 14.5 gpm | 20 psi | ON | | | ON | | ON | ON |
| 14.5 gpm | 30 psi | | | | ON | ON | | ON |
| 15.0 gpm | 20 psi | | ON | | ON | | ON | ON |
| 15.0 gpm | 30 psi | ON | | | | | ON | ON |
| 15.0 gpm | 40 psi | | | ON | | ON | ON | |
| 15.0 gpm | 50 psi | | ON | ON | ON | | ON | |
| 15.0 gpm | 60 psi | | | | | | ON | ON |
| 15.5 gpm | 20 psi | | | | | ON | ON | ON |
| 15.5 gpm | 30 psi | | ON | | | | ON | ON |
| 15.5 gpm | 40 psi | | ON | ON | | ON | ON | |
| 15.5 gpm | 50 psi | ON | | ON | ON | | | ON |
| 15.5 gpm | 60 psi | ON | | | ON | | ON | |
| 16.0 gpm | 20 psi | ON | | | | ON | ON | ON |
| 16.0 gpm | 30 psi | | ON | ON | ON | ON | ON | |
| 16.0 gpm | 40 psi | ON | ON | ON | | ON | ON | |
| 16.0 gpm | 50 psi | | ON | ON | ON | | | ON |
| 16.5 gpm | 30 psi | ON | | ON | | | ON | ON |
| 16.5 gpm | 40 psi | | | | | | ON | ON |
| 16.5 gpm | 50 psi | ON | | ON | | | ON | ON |
| 16.5 gpm | 60 psi | | ON | | | ON | ON | |
| 17.0 gpm | 20 psi | ON | ON | | | ON | ON | ON |
| 17.0 gpm | 30 psi | | | | ON | | ON | ON |
| 17.0 gpm | 40 psi | | ON | ON | | ON | ON | |
| 17.0 gpm | 50 psi | | | ON | | ON | | ON |
| 17.5 gpm | 20 psi | | | | ON | ON | ON | ON |
| 17.5 gpm | 30 psi | ON | | ON | | ON | ON | |
| 17.5 gpm | 40 psi | ON | ON | ON | | ON | | ON |
| 17.5 gpm | 50 psi | ON | | | | ON | ON | ON |

NOZZLE CONFIGURATION

| Flow Rate | Pressure | A | B | C | D | E | F |
|---|---|---|---|---|---|---|---|
| 18.0 gpm | 20 psi | ON | | | ON | ON | ON |
| 18.0 gpm | 30 psi | | ON | | ON | | ON |
| 18.0 gpm | 40 psi | | | ON | | ON | ON |
| 18.5 gpm | 20 psi | | ON | | ON | ON | ON |
| 18.5 gpm | 30 psi | | | ON | ON | | ON |
| 18.5 gpm | 40 psi | ON | ON | | | | ON |
| 18.5 gpm | 60 psi | | | | ON | ON | ON |
| 19.0 gpm | 20 psi | ON | ON | | ON | ON | ON |
| 19.0 gpm | 30 psi | ON | | ON | ON | | ON |
| 19.0 gpm | 40 psi | ON | | ON | | | ON |
| 19.0 gpm | 50 psi | ON | ON | | ON | ON | ON |
| 19.5 gpm | 30 psi | | | ON | ON | ON | |
| 19.5 gpm | 40 psi | | | | | ON | ON |
| 19.5 gpm | 50 psi | | | ON | | | ON |
| 19.5 gpm | 60 psi | ON | ON | ON | | ON | ON |
| 20.0 gpm | 30 psi | ON | ON | ON | ON | | ON |
| 20.0 gpm | 40 psi | ON | | | ON | | ON |
| 20.0 gpm | 50 psi | | | ON | | | ON |
| 20.0 gpm | 60 psi | | | ON | | ON | ON |
| 20.5 gpm | 40 psi | ON | ON | ON | ON | ON | |
| 20.5 gpm | 60 psi | | ON | ON | ON | ON | |
| 21.0 gpm | 30 psi | | | ON | ON | ON | |
| 21.0 gpm | 40 psi | | | ON | ON | | ON |
| 21.0 gpm | 50 psi | ON | ON | ON | ON | ON | ON |
| 21.0 gpm | 60 psi | ON | ON | ON | | ON | |
| 21.5 gpm | 30 psi | ON | | | ON | ON | |
| 21.5 gpm | 50 psi | | ON | ON | | | ON |
| 21.5 gpm | 60 psi | | ON | | ON | ON | |
| 22.0 gpm | 40 psi | ON | | | ON | ON | |
| 22.0 gpm | 50 psi | ON | | ON | | ON | |
| 22.0 gpm | 60 psi | | | ON | | | ON |
| 22.5 gpm | 30 psi | | | ON | ON | ON | |
| 22.5 gpm | 40 psi | | ON | ON | ON | | ON |
| 22.5 gpm | 50 psi | | ON | | ON | | ON |
| 23.0 gpm | 40 psi | | | ON | | ON | ON |
| 23.0 gpm | 60 psi | ON | | ON | ON | ON | |
| 23.5 gpm | 50 psi | ON | ON | | ON | | ON |
| 23.5 gpm | 60 psi | | ON | ON | | | ON |
| 24.0 gpm | 40 psi | | | | ON | ON | ON |
| 24.0 gpm | 50 psi | ON | | ON | ON | | ON |

FIG. 4B

NOZZLE CONFIGURATION

| Flow Rate | Pressure | A | B | C | D | E | F | G |
|---|---|---|---|---|---|---|---|---|
| 24.5 gpm | 40 psi |  | ON | ON |  | ON | ON | ON |
| 24.5 gpm | 50 psi |  | ON | ON | ON |  | ON | ON |
| 24.5 gpm | 60 psi | ON | ON | ON | ON | ON |  | ON |
| 25.0 gpm | 40 psi | ON | ON | ON |  | ON | ON | ON |
| 25.0 gpm | 50 psi |  | ON |  |  | ON | ON | ON |
| 25.0 gpm | 60 psi |  | ON |  | ON |  | ON | ON |
| 25.5 gpm | 40 psi |  | ON |  | ON | ON | ON | ON |
| 25.5 gpm | 50 psi | ON | ON |  |  | ON | ON | ON |
| 25.5 gpm | 60 psi |  |  | ON | ON |  | ON | ON |
| 26.0 gpm | 40 psi |  |  | ON | ON | ON | ON | ON |
| 26.0 gpm | 50 psi | ON |  | ON |  | ON | ON | ON |
| 26.5 gpm | 40 psi | ON |  | ON | ON | ON | ON | ON |
| 26.5 gpm | 50 psi |  |  |  | ON | ON | ON | ON |
| 26.5 gpm | 60 psi | ON |  |  |  | ON | ON | ON |
| 27.0 gpm | 50 psi |  |  | ON | ON |  | ON | ON | ON |
| 27.0 gpm | 60 psi |  |  | ON | ON | ON |  | ON | ON |
| 27.5 gpm | 50 psi | ON | ON | ON |  | ON | ON | ON |

NOZZLE CONFIGURATION

| Flow Rate | Pressure | A | B | C | D | E | F |
|---|---|---|---|---|---|---|---|
| 28.0 gpm | 40 psi | ON | ON | ON | ON | ON | ON |
| 28.0 gpm | 50 psi |  | ON |  | ON | ON | ON |
| 28.0 gpm | 60 psi | ON | ON |  |  | ON | ON |
| 28.5 gpm | 50 psi |  |  |  | ON | ON | ON | ON |
| 29.0 gpm | 60 psi |  |  |  | ON | ON | ON |
| 29.5 gpm | 60 psi |  |  | ON | ON |  | ON | ON |
| 30.0 gpm | 50 psi |  |  | ON | ON | ON | ON | ON |
| 30.0 gpm | 60 psi | ON |  |  | ON | ON | ON |
| 30.5 gpm | 60 psi |  |  | ON |  | ON | ON | ON |
| 31.0 gpm | 50 psi | ON | ON | ON | ON | ON | ON |
| 31.5 gpm | 60 psi | ON | ON |  | ON | ON | ON |
| 32.0 gpm | 60 psi | ON |  | ON | ON | ON | ON |
| 33.0 gpm | 60 psi |  |  | ON | ON | ON | ON | ON |
| 33.5 gpm | 60 psi | ON | ON | ON | ON | ON | ON |

FIG. 4C

METHOD AND APPARATUS FOR TREATMENT OF CONTAMINATED SOIL PARTICLES

FIELD OF THE INVENTION

The present invention relates to environmental protection, and particularly to the biological recovery of oil or chemically polluted soil through the application thereto of either chemical or bacteriological substances capable of removing the contamination from the soil particles.

BRIEF DESCRIPTION OF THE PRIOR ART

The wide-spread pollution of water and soil with oil or other deleterious chemical components is attributed to the ever growing volumes of well output, transportation, refining, storage and utilization of oil, oil products and other chemicals. Traditional methods of recovery, such as mechanical, chemical and physical fail to provide a sufficient degree of recovery of contaminated soil within a reasonable time period. It has therefore been suggested and tried to achieve soil decontamination by resort to the resources of nature itself, i.e., the effective use of microorganisms capable of assimilating the hydrocarbons of oil. This method has been employed with a reasonable degree of success when applied to oil polluted water but, when the attempt is made to apply microorganisms to soil, the success rate has not been significant.

A major problem involved in effecting the decontamination of contaminated soil particles through the utilization of microorganisms is the fact that a significant degree of moisture must be present at all times while the microorganisms are doing their work. When a large area, such as a beach, is being treated, the water content of the soil or sand is solely dependent upon the weather conditions. Moreover, the physical handling of the soil for treatment represents a substantial problem and has resulted in time consuming and expensive operations such as described in Smith U.S. Pat. No. 5,039,415 wherein the contaminated soil is successively treated with microorganisms and then permitted to lay in a layer during which time the water content normally evaporates. The soil in the layer is then turned over and picked up and retreated a second and even a third time. The treatment of the soil particles by the Smith patent method involves the upward discharge of the soil particles which are impacted with a water spray during the so called dwell period of their discharge path. The speed of movement of the particles is necessarily high, hence this method of treatment results in up to 50% of the surfaces of the soil particles never being contacted by the aqueous solution of the appropriate bacteria or microorganisms.

Norris, et al. U.S. Pat. No. 4,849,360 proposes to treat oil contaminated soil by placing the soil in a pit after having microorganisms applied thereto and then passing a gas containing oxygen into the layer of soil to maintain the layer in an aerobic condition.

U.S. Pat. No. 4,993,498 to Fresnel deals primarily with the treatment of beach sand to eliminate exogenous pathogenic germs which thrive in a beach sand environment. A portable machine is provided which picks up the sand to be treated and separates the sand from other wastes. The sand is then projected as a cloud into a container and concurrently subjected to a horizontal spray of liquid containing the chemical-bacteriological decontaminating elements. In an alternate embodiment, the sand is treated by the spray during the fall onto a screen. The Fresnel patent is important in that it recognizes the need for spraying a minimum quantity of fluid on the sand to be treated such that a majority of the sand grains are wet, without unnecessarily soaking the entire terrain.

There is a need, therefore, for an apparatus capable of treating soil particles at a high mass rate, say up to 200 tons per hour, and effectively applying an aqueous solution containing the chemical and bacteriological treating agents or microbes to the soil particles in such manner that substantially all of the surfaces of each soil particle is contacted by the treatment liquid.

SUMMARY OF THE INVENTION

This invention provides a method and apparatus for treatment of contaminated soil by a solution of anti-contaminant chemicals and/or bacteriological agents in such manner that substantially all of the contamination is removed from the soil in a much shorter time that has been possible with prior art methods.

The method of this invention contemplates the utilization of a standard soil shredder such as the shredder currently sold by Royer Industries, Inc. of Kingston, Pa. Such shredder has a hopper for receiving contaminated soil by the dumping of loads of such soil into the hopper by large loaders. The machine conventionally separates large rocks and trash from the soil and passes the soil by a shredding belt through rows of steal cleats, that shred, mix and aerate the soil, thus reducing the soil to particles having a substantially uniform maximum size.

In accordance with this invention, the soil particles are elevated by a conveyor to a position above a non-contaminated soil area, or a concrete slab, if one is available, and the soil particles are discharged downwardly from the conveyor in such fashion as to form an ever-growing conically shaped pile of particles.

Concurrently with the deposit of the particles of the non-contaminated surface, a liquid spray comprising a water emulsion containing one or more chemical and/or bacteriological treatment agents is produced which falls in a downward direction in a generally conical pattern to impact on all of the external surface of the growing conical pile of particles. More importantly, the deposition of the soil particles in a conical pile inherently produces a rolling action of the particles down the sides of the pile and this rolling action is facilitated by the downward discharge of the treatment solution. It is thereby assured that areas of each particle which were not directly impacted by the liquid spray of decontamination solution while falling are contacted by the liquid during their roll down the sides of the ever growing cone of particles. Thus a very high percentage of particles have all of their exposed surfaces contacted by the anti-contaminating solution.

In recognition of the fact that the action of the microbes or bacteriological agents is highly dependent upon the existence of moisture, this invention preferably provides means for measuring the moisture content of the particles in the pile. This may be accomplished by a center post in the pile containing moisture measuring detectors at vertically spaced intervals on the posts so that the water content of the treated particles may be continuously monitored as the conical pile is formed. The same post may support a plurality of generally radial pipes to supply air or water to the interior of the conical pile.

After the conical pile has reached the desired maximum height, which is determined by the height of the discharge conveyor on the shredding machine, the shredding machine may be moved so that the discharge conveyor overlies another uncontaminated area and a second pile of treated particles may be built up.

After the requisite time period required for the reaction of the microbes and/or chemicals with the contaminating agents on the particles, the center post is removed and the treated soil particles in each pile is picked up by loaders and restored to the area from which the contaminated particles had been removed.

Obviously, the flow rate of solution necessary to provide the proper level of predetermined water and remedial solution concentration to each yard of contaminated soil may be determined by reference to an appropriate chart. In a preferred embodiment of the invention, however, a computer or microprocessor is provided, as is contaminated particle weighing apparatus. Such weighing apparatus generates signals for forming one input to the computer. The moisture detection apparatus disposed in each pile of treated particles is of the type that produces a second set of input signals to the computer indicating the moisture content of the growing pile. The computer then correlates these two inputs to vary the rate of speed of the conveyor drive which moves the raw contaminated soil to the shredder discharge elements of the soil particle forming machine or the flow volume of the treatment solution. The computer may also produce a display or a printout illustrating the mass rate per hour, the moisture content of the resulting pile of soil particles, the total tonnage of particles treated and the gallons of decontaminating solution utilized.

Further advantages of the invention will be readily apparent to those skilled in the art from the following description, taken in conjunction with the annexed sheets of drawings, on which is shown the preferred embodiments of the invention.

DESCRIPTION OF DRAWINGS

FIGS. 4a, 4b. and 4c constitute reproductions of a chart which may be utilized for manual control of the shredding and treatment apparatus illustrating the number of valves controlling the flow of treatment liquid through the spray nozzles that must be turned on in order to achieve desired flow rates at various flow pressures.

DESCRIPTION OF PREFERRED EMBODIMENTS

Bioremediation or chemical remediation of contaminated soils is accomplished most effectively when a controlled application of remediation spray distributes the proper amounts of remediation agents (microbes or chemicals), nutrients or catalysts and water onto the contaminated particles.

As the contaminated soil is broken into small particles by a shredder or other means, the remediation spray is continuously applied onto a growing conical pile of contaminated soil. The application rate is predominately based on the existing moisture percentage in the conical pile of contaminated particles, the shredder soil discharge rate, and the amount of microbiological or chemical solution concentration. The net result of the process is to achieve the proper percent concentration of all ingredients applied evenly and thoroughly onto the contaminated particles to maximize the remediation effectiveness as well as minimize the remediation time. The flow rate in gallons per minute of the water solution containing the microbiological agents may be determined by the following formula:

$$G = M \times [(F-E)/(1-F)] \times 3.37$$

where

G = Pump flow rate (g.p.m.)
F = Final moisture content percentage
E = Existing moisture content percentage of soil particles
M = Soil particles flow rate in yards per hour The microbiological or chemical agents are added to water and mixed together in a separate tank, preferably a tank truck. Additionally, the flow rate charts shown in FIGS. 4a-4c provide the required valve configuration which will produce the desired flow rate. Each flow rate can be achieved with usually several different choices of fluid pressure. This allows for greater operator flexibility in choosing a spray pressure as well as choosing the number and location of spray nozzles to be utilized as the pile grows in height.

Figure 1:
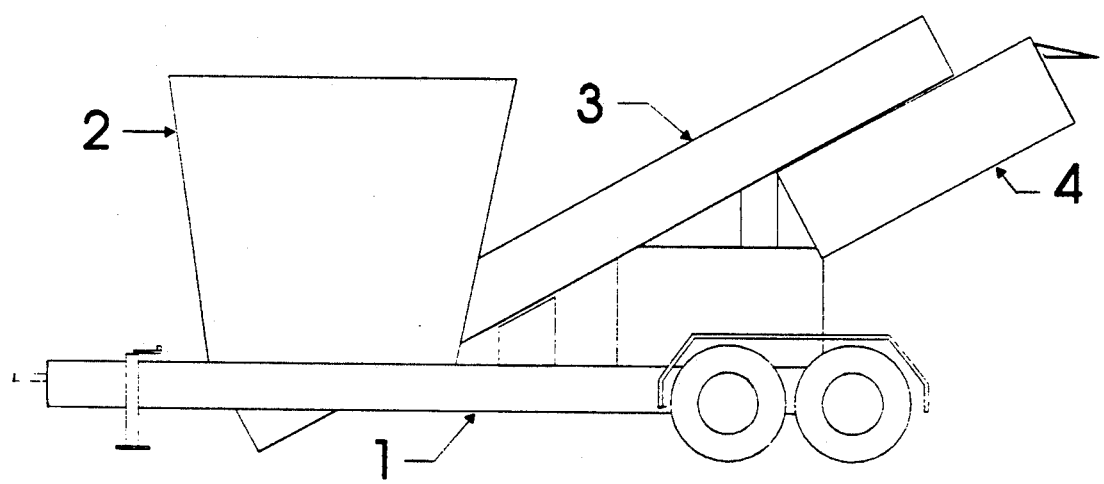
FIG. 1 is a schematic perspective view of a shredding machine for converting contaminated soil into soil particles of substantially uniform maximum size.

Referring to FIG. 1, there is schematically shown a well known form of soil shredder 1 which is marketed by Royer Industries, Inc. of Kingston, Pa. Such machine includes a hopper 2 into which bucket loads of contaminated soil may be deposited by loaders. Such hopper normally includes a grate (not shown) at the upper portion thereof to prevent large stones and other unwanted debris from progressing downwardly into the hopper.

Figure 2:
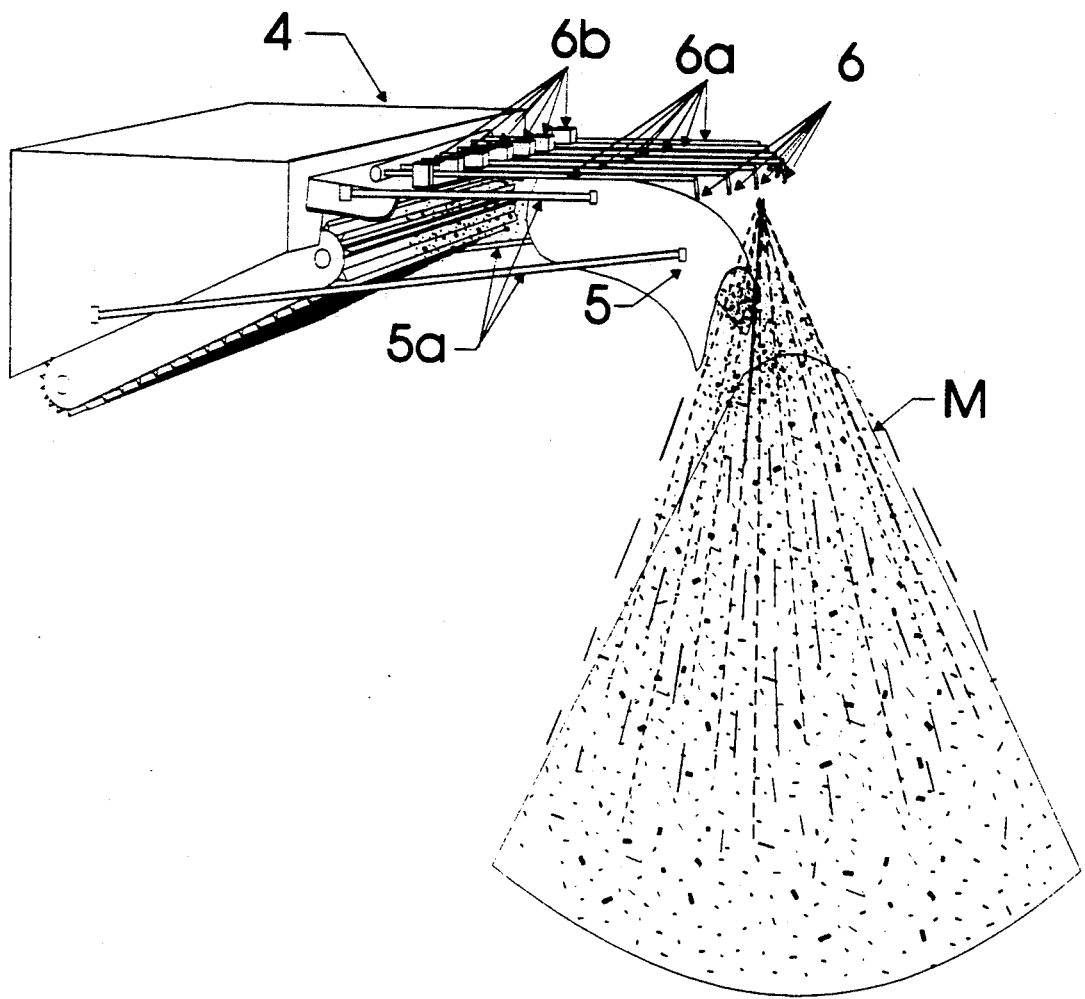
FIG. 2 is a schematic view of the discharge end of the machine of FIG. 1 illustrating the disposition of the spray nozzles relative to the conical pile of soil particles produced by discharge of soil particles from the shredding machine.

A conveyor 3 extends through the bottom of hopper 2 and moves the soil particles upwardly to enter a conventional soil shredder 4 which constitutes another upwardly moving conveyor cooperating with a plurality of overlying, closely spaced blades (not shown) which effect the shredding of the soil into particles of substantially uniform maximum size. The particles are discharged from the upper end of shredder 4 and, in accordance with this invention, are thrown outwardly into contact with a generally parabolically shaped deflector 5 mounted by rods 5a to the upper end of the shredder 4, as best shown in FIG. 2. The function of the deflector 5 is to direct the soil particles downwardly so as to produce a steadily growing conical mass M of contaminated soil particles which are preferably deposited on a non-contaminated soil surface or a concrete slab. If neither of these bases are available, a sheet of plastic may be employed overlaying contaminated soil upon which the growing conical mass of contaminated soil particles may be deposited.

In accordance with the invention, a plurality of downwardly directed spray nozzles 6 are mounted on the outer end of pipes 6a each of which extends back to a control valve unit 6b which is connected to a header 7. The nozzles are preferably disposed in an arcuate or angular array and the flow through the nozzles 6 is controlled to produce a generally conical spray on the growing conical shaped mass of soil particles.

The combination of directing the soil particles to form a growing conical shaped mass, plus the downward impact of the spray issuing from the nozzles 6, effects a rolling action of the contaminated soil particles down the sides of the conical shaped mass. Thus, particles which have portions not wet by the treatment liquid supplied from the nozzles 6 during their downward fall, tumble downwardly on the sides of the growing conical shaped mass of particles which are already wet. Thus, substantially 100% wetting of the surfaces of the soil particles by the treatment solution is produced.

The treatment solution utilized depends, of course, upon the nature of the contamination existing on the soil particles. For hydrocarbon contamination, for example, any of the treatment agents specified in the aforementioned Smith U.S. Pat. No. 5,039,415 may be utilized. All of these agents are of a bacteriological nature and, in effect, attack the hydrocarbon contamination and convert it into unobjectionable water and carbon dioxide.

For other forms of contamination, water solutions of appropriate treatment agents known in the prior art would be used.

As is well known, however, the decontamination action of bacteriological microbes on hydrocarbons is highly dependent upon the maintenance of a predetermined moisture content in the soil particles. For this reason, not only does the concentration of the bacteriological treatment agents in the water solution have to be carefully controlled, but also, the moisture content in the soil particles must be periodically determined and appropriate adjustments made in the amount of water applied to the growing conical mass of soil particles.

Figure 3:
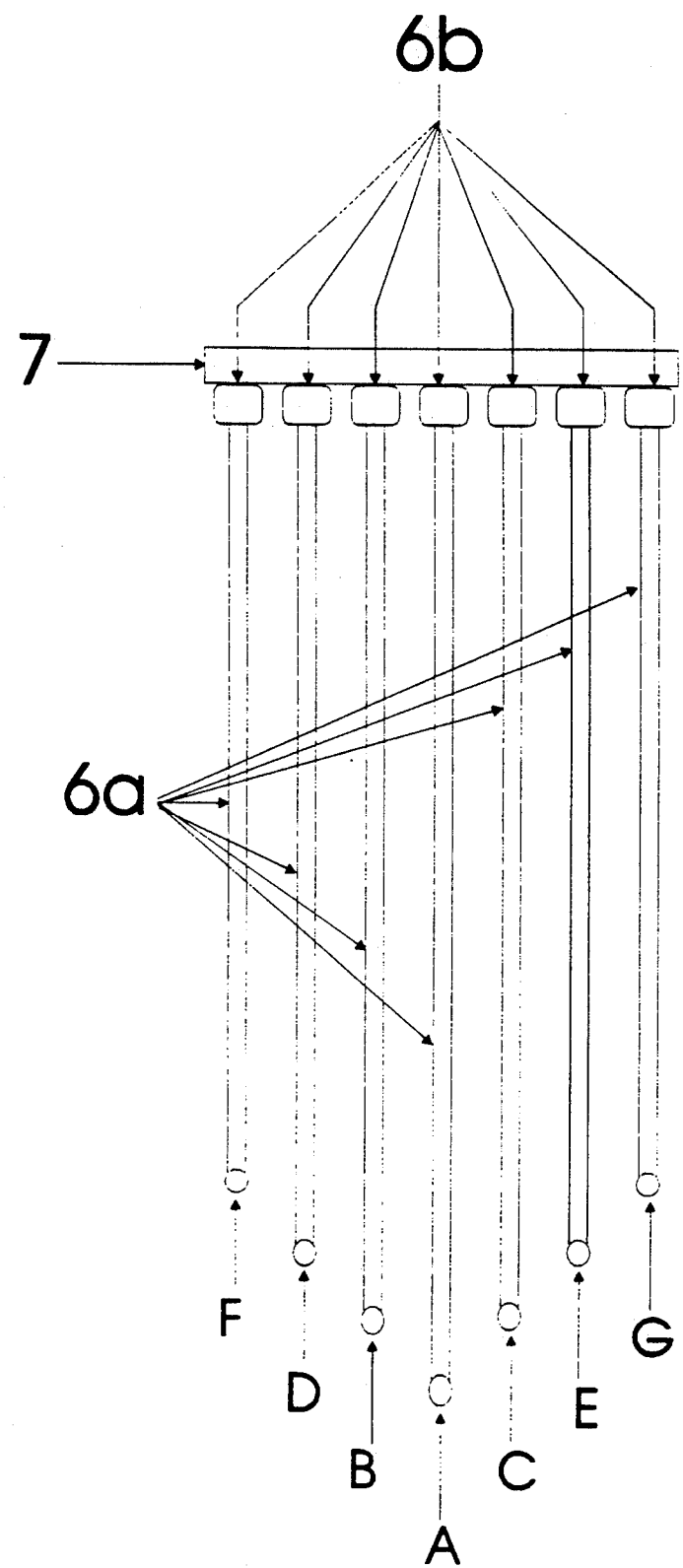
FIG. 3 is a schematic top view of the spray nozzles and their respective control valves.

If the soil treatment is to be accomplished by manual controls, then the charts illustrated in FIGS. 4a–4c are very helpful in defining for the operator the desired number and location of nozzles that should be turned on for any particular pump pressure and flow rate desired. The position of the spray nozzles 6 is preferably disposed in an angular array as best illustrated in FIG. 3. If seven spray nozzles are to be utilized, the central nozzle is designated as nozzle A and the remaining nozzles are labeled as designated in FIG. 3. The corresponding valves 6b for each of the thus labeled nozzles 6 are identified by similar letters in the charts shown in FIGS. 4a–4c, together with the operational condition of each such valve for a predetermined flow rate and predetermined pressure of the source of the water solution containing the decontaminating agents. The solution of decontaminating agents may be mixed and contained within an adjacent tank or tank truck. Any other tank and pump arrangement may be utilized for producing the desired pressure and flow rate of application of the decontaminating solution.

Figure 5:
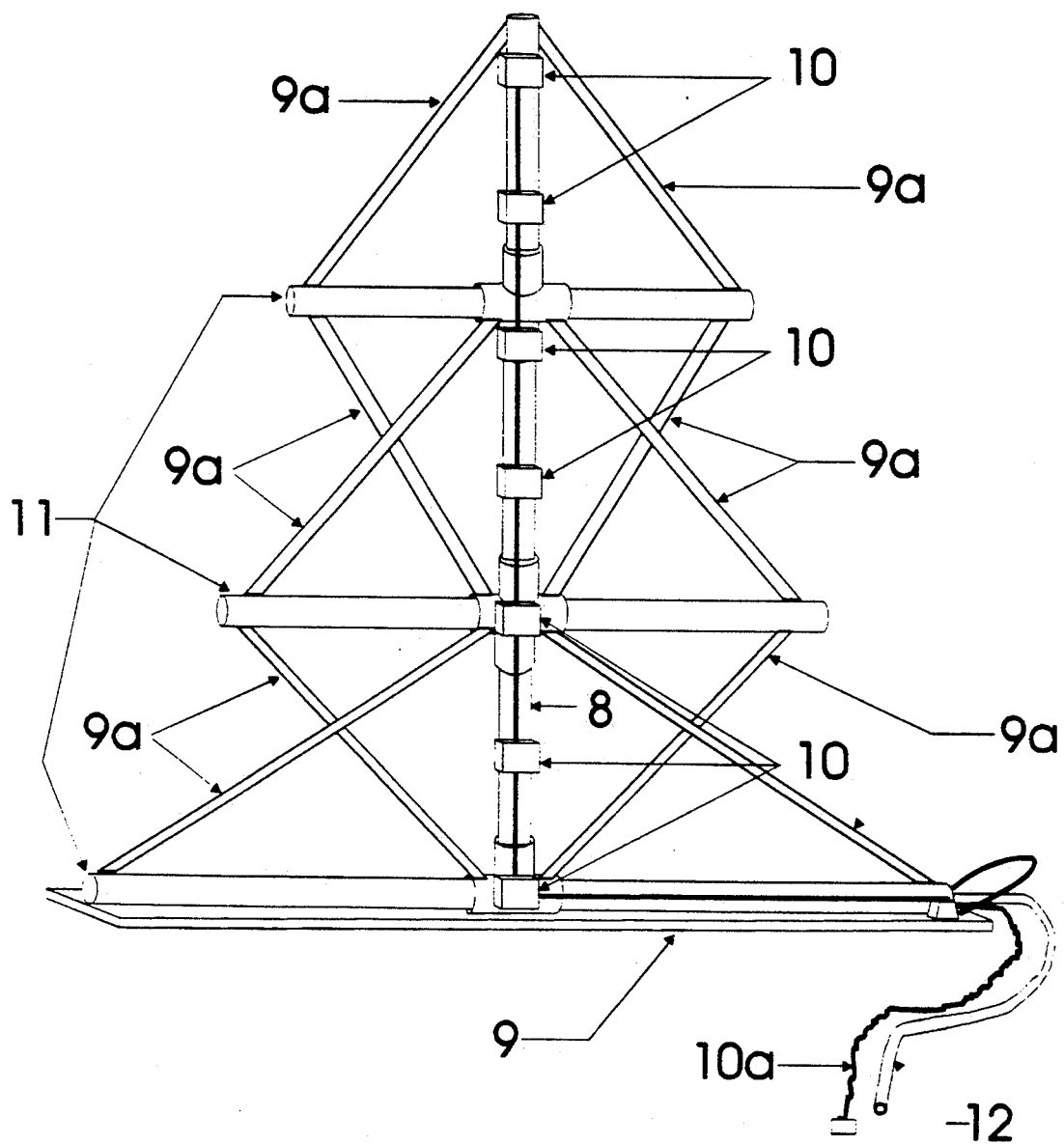
FIG. 5 is a schematic side elevational view of a moisture detecting structure around which a conical pile of soil particles is built.
Figure 6:
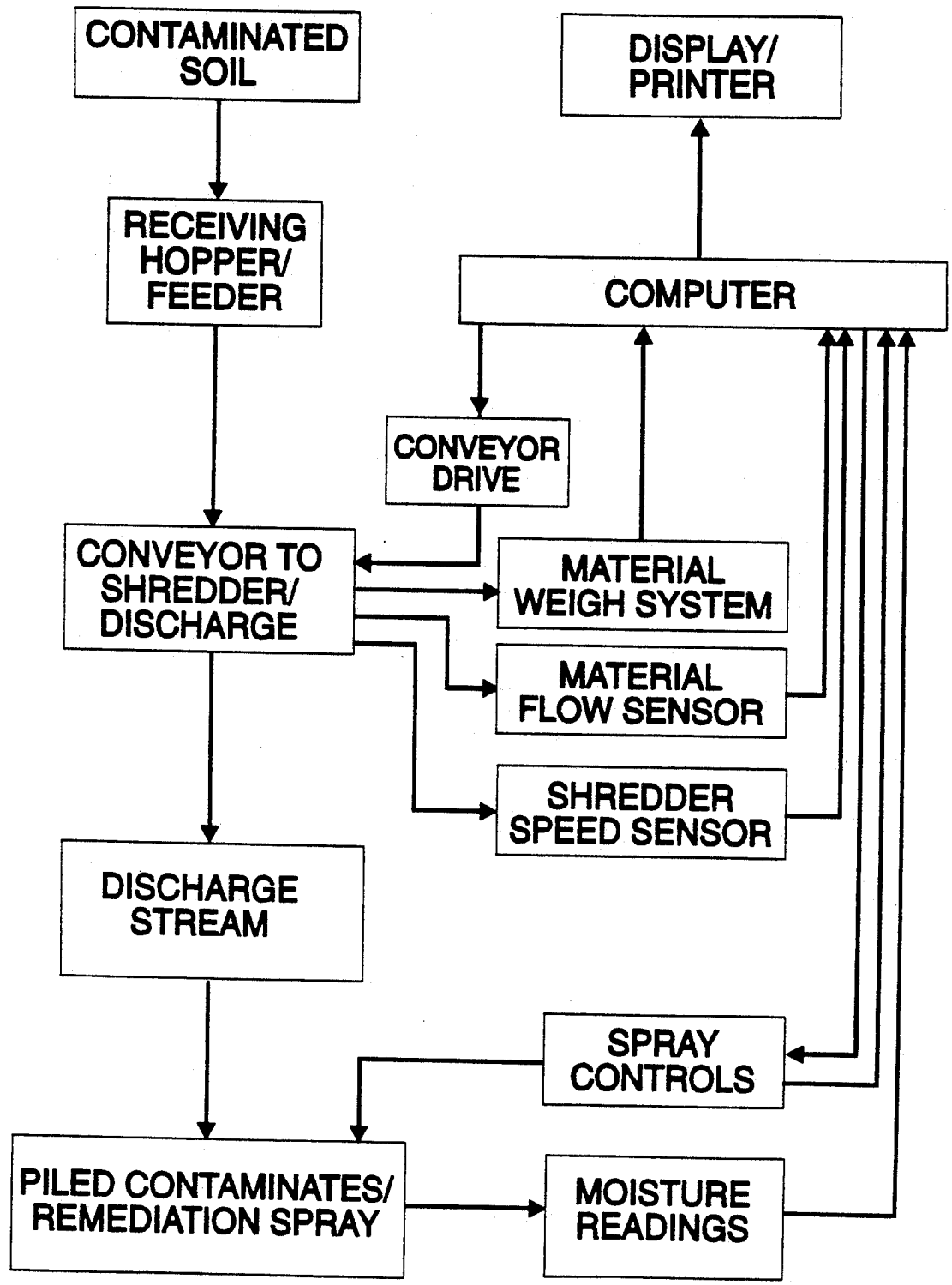
FIG. 6 is a schematic circuit diagram illustrating the application of a computer to effect the automatic control of the flow rate of treatment fluid applied to the pile of contaminated particles and the mass flow rate of the particles through the shredding machine as a function of the water content of the conical pile of contaminated particles.

In a preferred embodiment of this invention, a plurality of moisture probes 10 (FIG. 5) are mounted on a hollow center post 8 around which the conical mass of soil particles is built. Center post 8 is mounted in an upright position on a skid plate 9 and secured thereon by bracing 9a. Electrical leads 10a run up through hollow post 8 to each moisture detector 10.

In addition to the bracing 9a, a plurality of vertically spaced, horizontally disposed hollow pipes 11 may also be secured to the hollow center post 8 and provided with fluid communication with the interior of the hollow post 8. A hose 12 is then suitably connected to the interior of the hollow post 8 and thus a fluid may be transmitted through the center of the growing conical mass of soil particles and distributed therethrough through a plurality of small apertures (not shown) provided in the horizontal pipes 11 and the center post 8. In this manner, if the weather conditions are such that the conical mass of particles tends to achieve a moisture content below that desirable to promote the microbacterial action, water may be supplied throughout the interior of the pile of particles through the hose 12. Alternatively, a flow of air may be passed through the pile as an aerating fluid to accelerate aerobic remediation processes and prevent solidification of the soil particles, if the ambient weather conditions tend to make the pile of particles wet enough to solidify. In either event, the moisture content of the pile is maintained at an optimum to promote the microbiological conversion of the contaminates on the soil particles into an environmentally acceptable form.

Because of the criticalness of the moisture content and the concentration of bacteriological agents in achieving decontamination of the soil particles, the preferred embodiment of this invention incorporates a computer. The utilization of the computer is schematically shown in FIG. 6. Thus, signal inputs to the computer are derived from a conventional material weigh system to indicate the amount of soil being fed into the shredder and the rate of such flow. The computer input also receives moisture content readings from the moisture detectors employed in the conical mass of soil particles. With these inputs, the computer is programmed to control the conveyor drive, the rate of flow of the solution containing the decontaminating agents and the particular valves that are opened or closed in order to obtain the desired optimum decontamination rate.

With such input factors being evaluated by the computer, the resultant conical mass of soil particles treated by the solution containing the decontaminating agents is subjected to the microbiological decontamination process with optimum moisture content and optimum concentration of decontaminating agents.

Additionally, as indicated in FIG. 6, the computer may have a display or printer output to indicate the total weight of treated soil particles and the total volume of decontaminating solution applied to the soil particles.

It is therefore readily apparent to those skilled in the art that the method and apparatus of this invention provides an optimum system for effecting hydrocarbon, chemical or biological decontamination of contaminated soil particles. Modifications of this invention will be readily apparent to those skilled in the art and it is intended that all such modifications be included within the scope of the appended claims.

I claim:

1. The method of treating contaminated soil with a aqueous solution of decontaminating/agents comprising:
   breaking the contaminated soil into particles of substantially uniform maximum size;
   forming a stream of said particles having a selected mass flow rate;
   directing said stream of particles downward onto a selected surface in a manner to build a growing cone shaped mass of contaminated soil particles; and
   concurrently applying a cone shaped, downwardly discharge of an aqueous solution of decontaminating agents to said growing cone shaped mass at a rate selected to produce moistening of said growing cone shaped mass and assist in rolling of newly deposited particles down the sides of said cone shaped mass to expose more of each particle's surface area to contact by said aqueous solution of decontaminating agents.

2. The method of claim 1 further comprising the step of:
   continuously measuring the water content of said particles in said cone shaped mass; and
   adjusting the flow rate of said downward discharge to maintain a selected minimum water content and a selected concentration of decontaminating agents in said growing cone shaped mass of contaminated soil particles.

3. The method of claim 2 further comprising the step of providing a plurality of adjustable flow rate, downwardly directed, horizontally spaced spray nozzles to apply said downward discharge of the aqueous solution of decontaminating agents; and
   selectively adjusting the flow rates of said nozzles to maintain said selected minimum water content and concentration of decontaminating agents in said growing cone-shaped mass of contaminated soil particles.

4. The method of claim 3 further comprising the step of providing a computer;
   measuring moisture content of said growing cone-shaped mass and entering signals in said computer representing said varying moisture content;
   weighing the mass flow rate of said stream of particles and entering signals in said computer representing said mass flow rate; and
   controlling the mass flow rate of said stream of contaminated particles and the flow rates of said nozzles by said computer to maintain a selected minimum moisture content in said growing cone shaped mass of contaminated particles.

5. The method of claim 4 further comprising the steps of utilizing said computer to indicate total mass of particles treated.

6. The method of claim 4 further comprising the steps of utilizing said computer to indicate total gallonage of decontaminating solution applied.

7. Apparatus for decontaminating soil contaminated by environmentally undesirable chemicals comprising, in combination,
   means for shredding the contaminated soil into particles of substantially uniform maximum size;
   means for conveying the contaminated soil particles at a selected rate to an overhead position relative to a non-contaminated surface;
   means for discharging said contaminated soil particles from said overhead position to form a growing cone-shaped mass of contaminated particles on said non-contaminated surface; and
   means for concurrently applying a spray of a aqueous solution of decontaminating agents to the external surfaces of said growing cone-shaped mass, thereby assisting in downward rolling movement of particles moistened by said spray to expose more of the surfaces of said contaminated soil particles to contact with said aqueous solution.

8. Apparatus for decontaminating soil contaminated by environmentally undesirable chemicals comprising, in combination,
   means for shredding the contaminated soil into particles of substantially uniform maximum size;
   means for conveying the contaminated soil particles at a selected rate to an overhead position relative to a non-contaminated surface;
   means for discharging said contaminated soil particles from said overhead position to form a growing cone-shaped mass of contaminated particles on said non-contaminated surface;
   means for concurrently applying a spray of a aqueous solution of decontaminating agents to all surfaces of said growing cone-shaped mass, thereby assisting in downward rolling movement of particles moistened by said spray to expose more of the surfaces of said contaminated soil particles to contact with said aqueous solution;
   means for detecting the water content of the contaminated soil particles; and
   means for controlling the flow rate of said aqueous solution to maintain a selected minimum moisture content in said growing conical mass of contaminated particles.

9. The apparatus of claim 7 further comprising a computer;
   means for supplying first input signals to said computer indicating the mass flow delivery rate of said contaminated soil particles to said overhead position;
   means for continuously measuring the water content of said growing conical mass of contaminated soil particles and generating second input signals to said computer; and
   means controlled by said computer for varying the volume of said spray of liquid solution of decontaminating agents to maintain a selected minimum water content and concentration of decontaminating agents in said conical growing mass of said contaminated particles.

10. The apparatus of claim 9 further comprising means operable by said computer for indicating the total mass of soil particles treated.

11. The apparatus of claim 9 further comprising means operable by said computer for indicating the total gallonage of treatment fluid applied to the contaminated soil particles.

12. The apparatus of claim 7 further comprising means for aerating the interior of said cone shaped pile.

13. The apparatus of claim 8 wherein said means for detecting the moisture content of said contaminated soil particles comprises a vertical center post around which said growing cone-shaped mass of contaminated particles is formed; and
   a plurality of moisture detectors mounted on said center post in vertically spaced relation.

14. The apparatus of claim 13 wherein said center post is hollow, and further comprising a plurality of pipes secured to said hollow center post in vertically spaced, radially projecting relationship, whereby a fluid may be supplied to the interior of said conical mass through said hollow center post.

* * * * *